J. JONES.
Butter Worker.
No. 24,698.  Patented July 5, 1859.
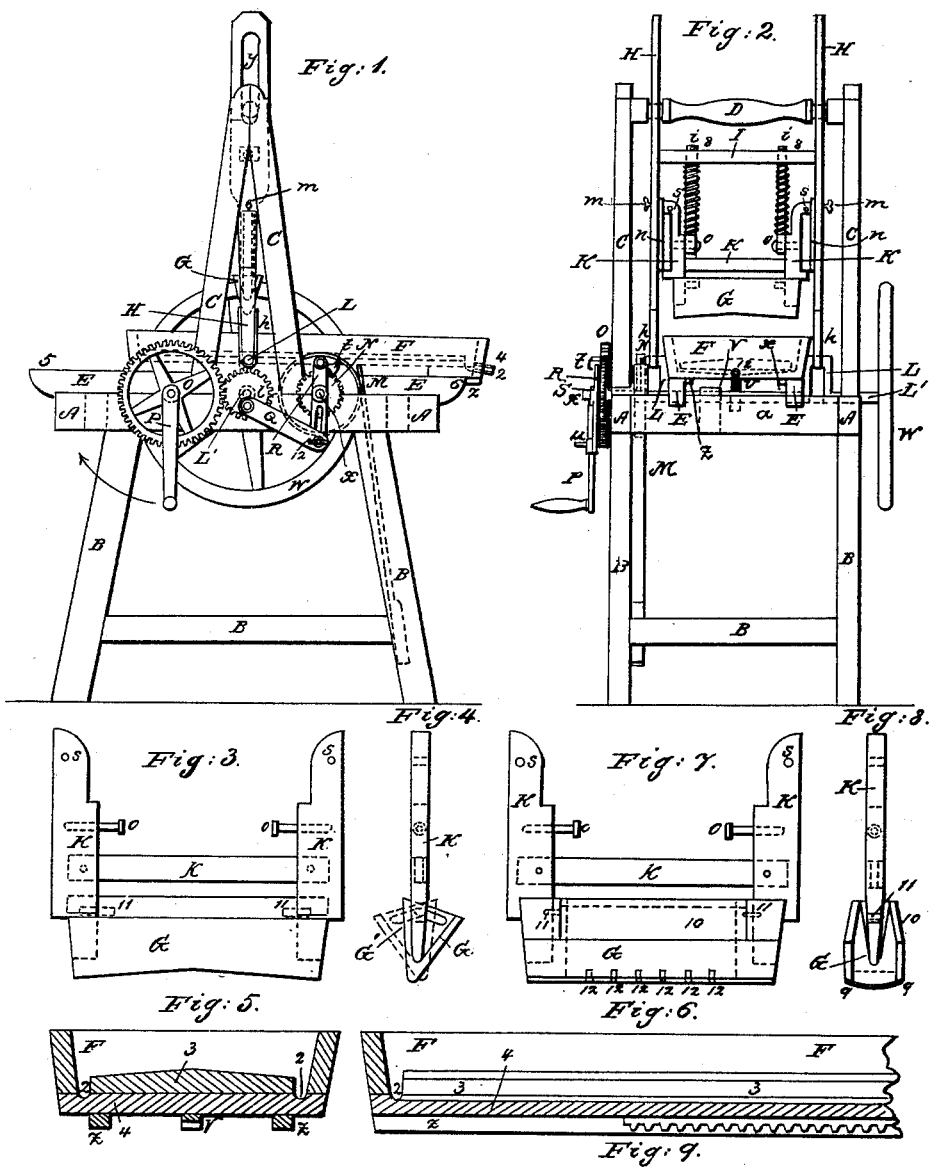
Witnesses:
George T. Chambs
James McMullan
Inventor:
Joseph Jones

UNITED STATES PATENT OFFICE.

JOSEPH JONES, OF PHILADELPHIA, PENNSYLVANIA, ASSIGNOR TO HIMSELF AND JAMES G. BRYCE, OF SAME PLACE.

BUTTER-WORKER.

Specification of Letters Patent No. 24,698, dated July 5, 1859.

*To all whom it may concern:*

Be it known that I, JOSEPH JONES, of the city of Philadelphia and State of Pennsylvania, have invented a new and Improved Mode of Working Butter; and I do hereby declare that the following is a full and exact description thereof, reference being had to the accompanying drawings and to the letters of reference marked thereon.

The nature of my invention consists: firstly, in giving the "beater" an up and down motion combined with a horizontal one, both of which are produced by a crank in continuous revolution the former for separating a portion of butter from the lump to be squeezed or "worked" by the latter on the bottom of an advancing tray; secondly, in so constructing the "beater," that while the operation of working the butter is going on, the buttermilk is taken up and retained by an absorbent placed within, or in contact with the rubbing surface of the "beater."

To enable others, skilled in the art, to make and use my invention, I will proceed to describe its construction and operation.

Figure 1, represents a side elevation of my butter worker with all the parts arranged for action. Fig. 2, an end elevation of the same. Figs. 3 and 4, represent an enlarged side and end view of the beater frame, with a reversing solid beater. Figs. 5 and 6, represent enlarged sectional views of the tray. Figs. 7, 8 and 9, represent the beater frame and hollow beater with a perforated bottom.

In Figs. 1 and 2, A, A and *a a* represent the frame of the machine to which the working parts are attached. This frame is supported on the legs B B. Upon the middle of the sides A A are erected two triangular frames C C situated opposite one another, one on each side of the supporting frame and joined at the top by a cross bar D.

The tray F rests and slides upon the rails or way pieces E E and is guided in its movements by the strips *z z* secured to its bottom. The arms H H are connected by iron straps *h h* to the cranks L L of the crank shaft L', are slotted in their upper ends and embrace the reduced portions of the cross bar, D, by which they are guided in their vertical movements. The "beater" G is connected with the side pieces K K of the beater frame by the pins *n n*, Figs. 3 and 7. K and K are united permanently by the cross bar *k*. The lower ends of K K rest in suitable recesses cut in the ends of the beater against which they press and turn as required during the working of the machine. The sides K K slide vertically in the adjustable grooved pieces *n n* which latter are secured to H H by the thumb screws *m m*. The beater G is pressed downward to the lower limit of its motion by the spiral springs *j j* which surround the pressing rods *i i;* these rods are notched and rest on the pins *o o* secured to the inner edge of the side bars K K, which latter are prevented from sliding too low down by the check pins *s s*.

On the front end of the crank shaft is a pinion *l* to which rotary motion is imparted by the spur wheel O and crank P. Upon the opposite end of the crank shaft is a balance wheel W for equalizing the motion. A crank pin *r* is secured in the pinion *l* for imparting a reciprocating advancing movement to the tray F, through the connecting rod Q, vibrating lever R, pawl *t*, ratchet S and rack and pinion U and V. The pawl *t* can be thrown over on the other side of the lever R for advancing the tray in the contrary direction and the lower arm of the lever R is slotted to vary the stroke of the pawl; the thumb screw *u* serving to secure the end of the connecting rod at any required point from the center of the lever.

On the ratchet shaft *x* is secured a friction wheel N against the periphery of which a spring M presses with considerable force; this resistance is created to counteract the tendency of the "beater's" horizontal motion to drag the tray with it.

In Figs. 3 and 4, the position G shown by the full lines is that which the beater naturally takes when the beater is rubbing on the tray from left to right and that shown by the dotted lines G' when the motion of the beater and tray is in the opposite direction.

When it is desirable to remove the beater from the machine to clean it, the thumb screws *m m* are "slacked," the grooved pieces *n n* are "slid" upward to release the notches which are cut in their lower ends and rest on pins not shown in the drawings, by removing the pins *s s*, the beater and frame can be drawn from the grooves. To facilitate these movements the cross bar I turns upon its ends, in holes in H H, and the spring rods *i i* are kept in their places by the pins 8 8.

In Figs. 5 and 6, F F, show the sides and ends of the tray, 4 4 the permanent bottom with its grooves 2 2 all around the movable bottom 3 upon which latter the butter is placed and on which the beater acts. The top surface of the movable bottom is sloped from the center toward the grooves 2 2 to drain the buttermilk from the butter during the working process. The guiding strips *z z* and the rack V are more distinctly shown in these figures than in Figs. 1 and 2. The end 5 Fig. 1 of the way upon which the tray slides is elevated in order that the buttermilk may flow to the opposite end in the grooves 2 2 Figs. 5 and 6, where it effects its final escape from the tray, through the tube *v*.

Figs. 7, 8 and 9 represent a modified form of beater. It consists of solid ends, jointed to the ends of the beater frame same as Figs. 3 and 4, connected by the sides and top of thin boards and by the perforated bottom of sheet metal or wire gauze. The perforated bottom is slightly convex and is kept in shape by the cross bars 12 12, &c.; access is had to the interior through an opening of the upper slanting portion of one side, which is closed by the door 10 hinged at the top. This form of beater acts against a movable bottom similar to 3 Fig. 5 but with a level top surface, or it may act on the fixed bottom 4 4 of the tray. The perforated bottom is covered with a cloth to prevent contact of metal and perforations with the butter and to absorb the buttermilk and convey it through the perforations to the sponges or other absorbent within.

The operation of the machine may be described as follows:—Rotary motion being imparted to the crank shaft L' by turning the crank P in the direction indicated by the arrow; the beater descends with the cranks L L upon a mass of butter (which may rest upon the tray) and, separating a portion, the beater comes in contact with the tray before the cranks have reached their lower "dead points"; at this moment the springs *j j* commence yielding to the continued descent of the frame H H, with its cross bar I and while the cranks are rounding their lower "dead points"; the beater is drawn a considerable distance over the surface of the tray and pressed against it with a force due to the tension of the springs *j j*, the detached portion of butter is thus submitted to a rubbing or squeezing process which most effectually expels every particle of buttermilk from it. In the upward motion of the cranks the beater is lifted from the tray and again descends upon the mass; the tray having advanced in the meantime by the mechanism already described, motion being imparted to it by the crank pin *r* in the pinion *l*. When the whole mass of butter has been submitted to this separating and rubbing process, a like operation may be repeated upon it by reversing the direction of the driving crank's motion and by throwing the pawl *t* on the other side of the lever R to move the tray in the opposite direction.

Most of those butter workers operated by hand levers are objectionable owing to the great labor required to operate them; this arises chiefly from the misapplication of human power, which is involved in their construction, the whole resistance of separating and squeezing coming directly upon the hands and involving about the same amount of labor as is experienced in the usual method of hand working. In other machines which submit the butter to a sort of rolling process between fluted or corrugated rolls, the expulsion of the buttermilk is not completely effected because, from the nature of the material, not a squeeze merely, but a rubbing pressure is required to free the butter from every trace of liquid. My machine combines the two essential features of a perfect butter worker; viz,—ease of operating the machine, which is secured by the use of a crank as the medium of application of hand power, the employment of "gear" to multiply speed and of a balance wheel as a reservoir, to intermit power at the time required, without sensibly affecting the hand; secondly, submitting every particle of the butter not only to pressure but also to a violent rub, both of which are performed in every revolution of the machine, in whatever direction it may be turned.

My butter worker is equally applicable to the thorough incorporation of butter with salt as in the expulsion of butter-milk, as well as to the mashing of boiled turnips, potatoes and other vegetables for the table, especially in hotels and large eating houses where the operation is a laborious one for hands.

Having now fully described the construction and operation of my improved butter worker, I claim—

The use of the yielding beater G, whether solid or constructed with an open or with a perforated bottom, inclosing an absorbing material as set forth, in combination with a traveling tray; the whole operated as described.

JOSEPH JONES.

Witnesses:
GEORGE K. RAMBO,
JAMES McMULLAN.